United States Patent [19]

Smalley et al.

[11] 4,368,899

[45] Jan. 18, 1983

[54] HITCH MECHANISM FOR TRACTORS AND IMPLEMENTS

[75] Inventors: Edward A. Smalley, Woodward; Mark J. Boguski, Duncan, both of Okla.; Todd A. Casey, Buhler; Dwight D. Chipperfield, McDonald, both of Kans.

[73] Assignee: Kansas State University Research Foundation, Manhattan, Kans.

[21] Appl. No.: 244,124

[22] Filed: Mar. 16, 1981

[51] Int. Cl.³ ............................ B60D 1/08; B60D 1/10
[52] U.S. Cl. ................................. 280/477; 280/421; 280/475; 280/479 R; 280/504
[58] Field of Search ............... 280/477, 478 R, 479 R, 280/475, 504, 508, 509, 420, 421, 422

[56] References Cited

U.S. PATENT DOCUMENTS

| | | | |
|---|---|---|---|
| 2,429,761 | 10/1947 | Ketel | 280/508 |
| 3,479,055 | 11/1969 | Cunha et al. | 280/421 |
| 3,521,908 | 7/1970 | Carter | 280/479 R |
| 3,834,738 | 9/1974 | Koch | 280/504 |
| 4,131,295 | 12/1978 | Highberger | 280/477 |
| 4,225,149 | 9/1980 | Koopman | 280/477 |
| 4,346,911 | 8/1982 | Wiese | 280/477 |

*Primary Examiner*—Joseph F. Peters, Jr.
*Assistant Examiner*—Donn McGiehan
*Attorney, Agent, or Firm*—Tilton, Fallon, Lungmus

[57] ABSTRACT

An automatic hitch mechanism that permits a tractor driver to connect and disconnect an implement without leaving the cab of the tractor. The hitch includes a tractor drawbar equipped with a power-driven slide member, hook member, and power coupling assembly all interconnected for coordinated movement so that during a hitching operation the hook member first swings into operative engagement with the latch ring of an implement and then, in a continuous sequence of automatic steps, the hook member is locked in its operative position, the power coupling assemblies of the tractor and implement are joined together, the jack supporting the implement tongue is retracted, and one of the coupling assemblies is de-stabilized so that thereafter the tractor and implement may execute turns and traverse uneven terrain without damaging or disengaging the coupling assemblies. Automatic unhitching of the tractor and implement involves a reversal in the direction and order of such steps.

24 Claims, 9 Drawing Figures

HITCH MECHANISM FOR TRACTORS AND IMPLEMENTS

BACKGROUND AND SUMMARY

Hitching and unhitching tractors and implements are everyday tasks on most farms yet, despite the time commonly required for such operations, the need for assistance in carrying them out, particularly in the case of larger tractors and implements, and the element of risk involved, no effective commercial systems are known to be available for performing the hitching (and unhitching) steps automatically, safely, and quickly by one person from the cab of a tractor. Some proposals have been made, and a few systems have been marketed, for facilitating certain of the steps involved in hitching operation, but such systems have lacked commercial success for a variety of reasons. Apart from their complexity and expense, prior construction have been deficient in failing to solve problems of coupling the hydraulic and/or electrical connectors without requiring an operator to dismount from the tractor, with the result that such devices have not effectively met the need for reducing time, labor, and possible risks in hitching-/unhitching operations.

Accordingly, it is a main object of this invention to provide a hitch mechanism that effectively hitches or unhitches an implement from a tractor, including the making or breaking of hydraulic/electrical connections, without requiring the operator to leave the cab of the tractor, and without the need for assistance by others in performing such operations. Another object is to provide a mechanism that is rugged and reliable, and that is relatively uncomplicated in structure and operation. As to the latter, it is a specific object to provide a mechanism that automatically and mechanically sequences to perform successive steps of a hitching or unhitching operation once such operation has been initiated by the driver of the tractor.

A still further object of the invention consists in providing a mechanism that is self-aligning in operation, assuming the tractor drawbar and implement tongue have been brought into reasonably close proximity prior to commencement of the automatic hitching operation.

Other objects, features, and advantages of the invention will become apparent from the specification and drawings.

DRAWINGS

DETAILED DESCRIPTION

Figure 1:
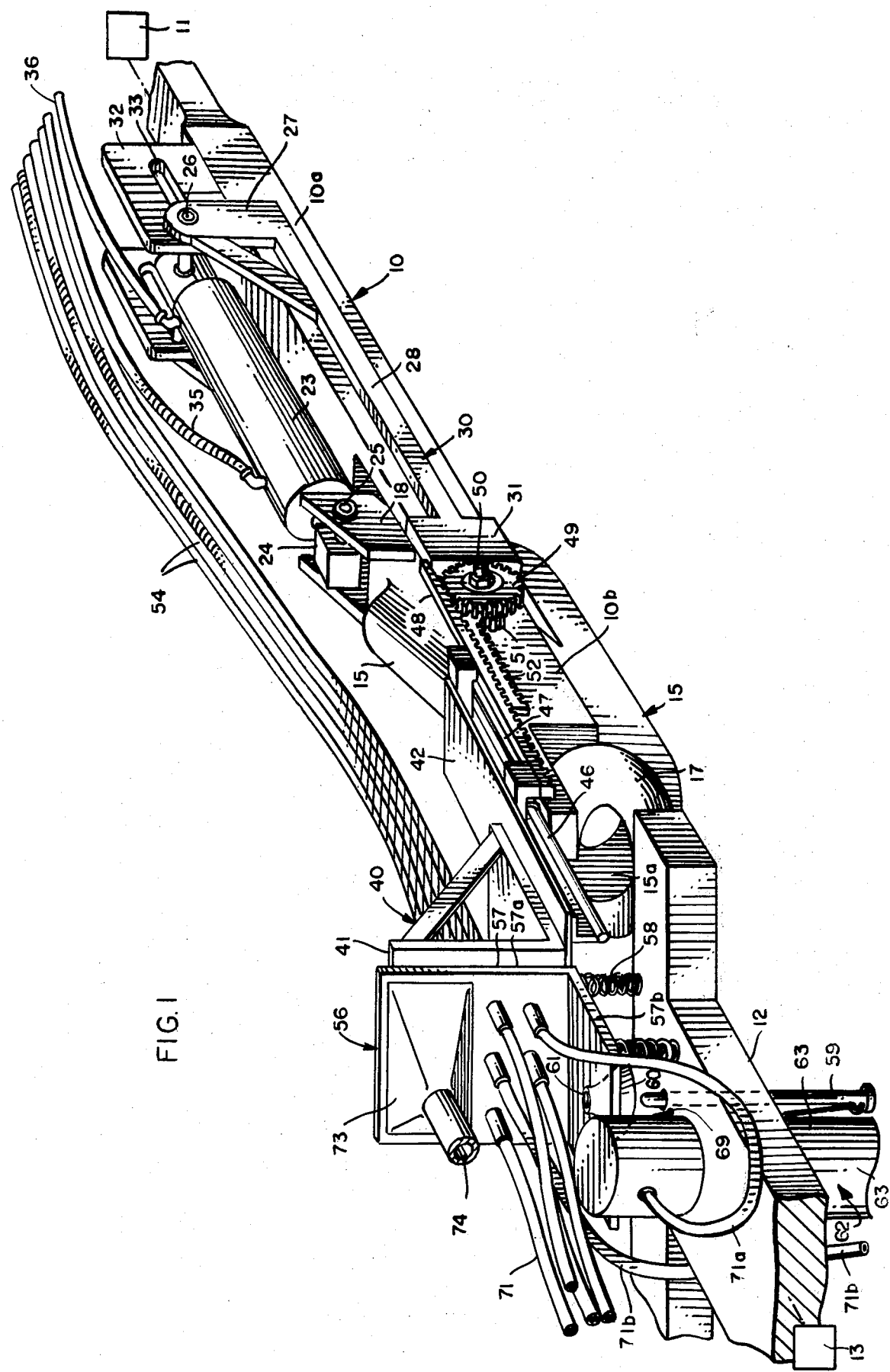
FIG. 1 is a perspective view showing the major components of the tractor-implement hitch mechanism.

Referring to FIG. 1, numeral 10 designates the drawbar of a tractor 11, and 12 designates the tongue of an implement 13. The tractor and implement are diagramatically depicted because they are entirely conventional except for the hitch mechanism to be described. While the term "tractor" generally refers to a farm tractor, it will be apparent that such equipment need not be limited to agricultural use; the tractor might, for example, be used in industry, road construction, and any of a variety of other fields where frequent hitching and unhitching of an implement are required. Similarly, the term "implement" is used herein to mean not only the various types of cultivators commonly used in farming, but also wagons and other trailing equipment, whether intended for farm use or for other uses.

Figure 2:
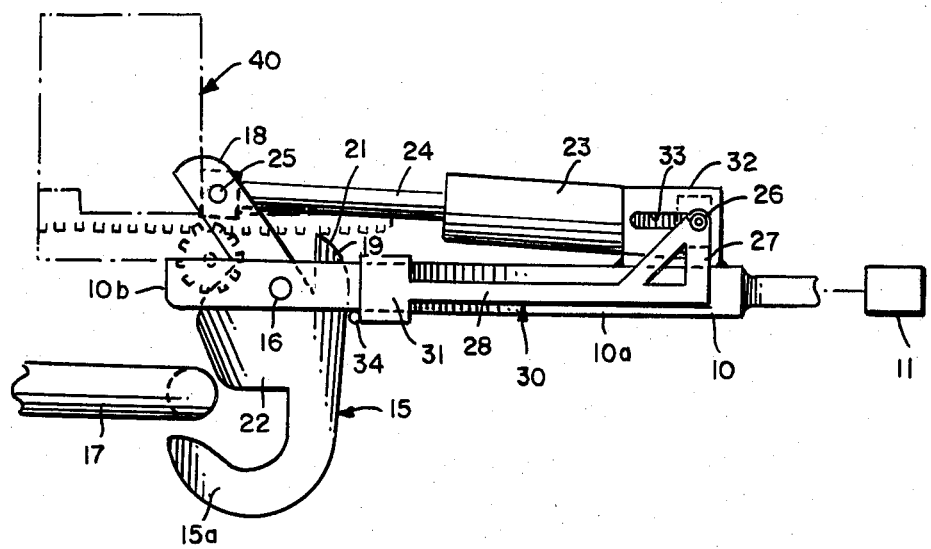
FIG. 2 is a simplified side elevational view of the hitch mechanism at the commencement of a hitching operation, certain of the components (particularly the plug-in coupler and its advancing mechanism) being depicted in phantom for clarity of illustration.
Figure 3:
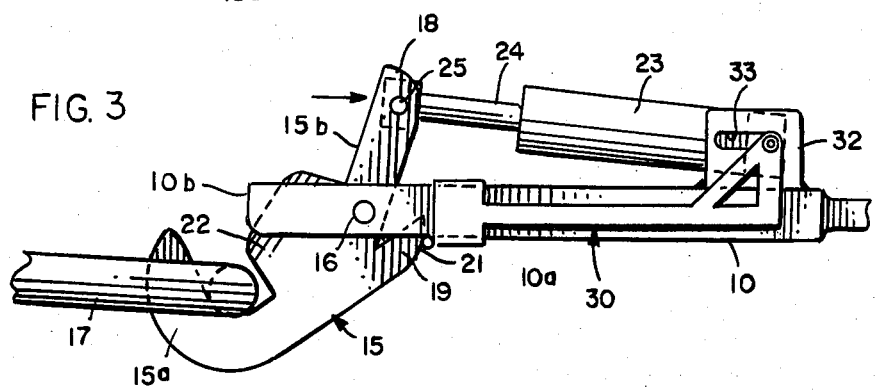
FIGS. 3–5 are similar to FIG. 2 (but omitting the structure depicted in phantom) showing subsequent steps in a hitching operation.
Figure 4:
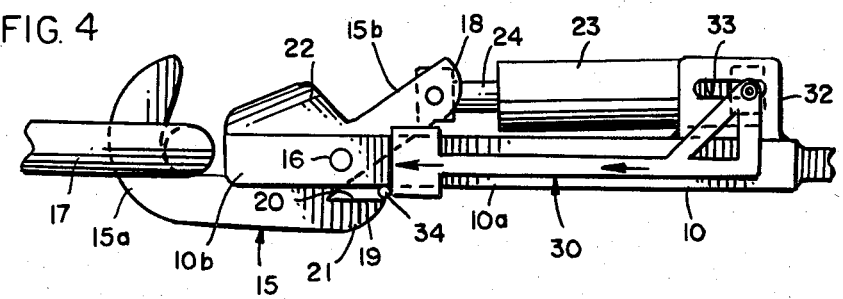
Figure 9:
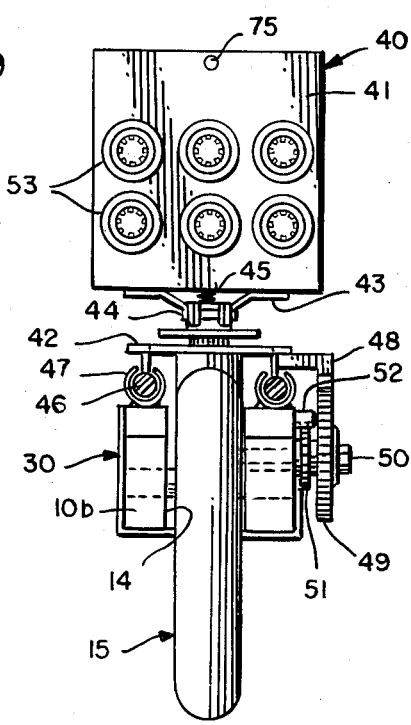
FIG. 9 is an enlarged end elevational view taken along line 9—9 of FIG. 6.

Drawbar 10 includes a straight shank portion 10a of uniform cross sectional configuration (preferably rectangular) and a rear end portion 10b. The rear end portion is provided with a centrally and vertically disposed recess 14 (FIG. 9) and a hook member 15 extends through the recess and is pivotally connected to the drawbar by a transversely-extending horizontal pin or shaft 16 (FIG. 2). The operative relationship between the drawbar and hook member 15 is most clearly depicted in FIGS. 2–5 where it will be seen that the hook member is mounted to pivot between a lowered position (FIG. 2) and a raised position (FIGS. 4 and 5).

Figure 5:
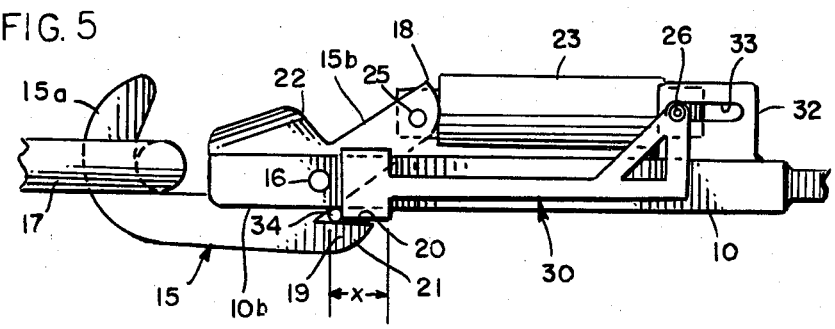

Hook member 15 includes a rear hook section 15a and a front section 15b, the terms "front" and "rear" being used to locate the respective sections when the hook member is in its normal raised position shown in FIG. 5. With the hook member in that position, the hook section 15a curves forwardly and upwardly for supporting and retaining the latch ring 17 carried at the front end of implement tongue 12.

The rear section 15b of hook member 15 includes a lever arm 18 which projects upwardly and rearwardly when the hook member is in its raised position, and a rearwardly-projecting heel portion 19, the heel portion and lever arm 18 being separated by a rearwardly tapering recess 20. The leading surface 21 of the heel is curved or arcuate, such curvature having a substantially uniform radiius from the pivot axis 16 of the hook member.

The hook member also includes an enlargement or abutment portion 22 located at an intermediate point for the purpose of guiding latch ring 17 into the opening of the hook and away from the free end 10b of the drawbar. The protrusion 22 therefore performs protective, directive, and retentive functions.

The hook member 15 is raised and lowered by an expandable-contractable power drive assembly which, in the illustration given, takes the form of hydraulic cylinder 23 and piston 24. The free end of the piston shaft 24 is connected to the end of lever arm 18 by pin 25, whereas the front end of cylinder 23 is connected by pin 26 to the upstanding and forwardly-disposed portions 27 of a pair of side arms 28 provided by slide member 30. The arms 28 terminate at their rear ends in a generally U-shaped carrier portion 31 which extends about the sides, bottom, and top edges of the shank portion 10a of the drawbar for guiding sliding movement of the slide member 30 in forward and rearward directions along the drawbar.

The front ends of cylinder 23 and slide member 30 are supported by a pair of spaced vertical plates 32 mounted upon drawbar 10 near the front end of shank portion 10a. Plates 32 are provided with horizontal slots 33 through which pin 26 extends; therefore, the slotted plates support both the cylinder 23 and slide member 30 and, in addition, establish (by the length of slots 33) the limits of horizontal movement of the cylinder and slide member with respect to the drawbar.

The slide member is provided at its rear end with a bearing element in the form of transverse rod 34 secured to carrier portion 31 and disposed beneath drawbar 10. The slide member 30 is dimensioned so that when hook member 15 is lowered (FIG. 2) the bearing element 34 will be in contact with, or in extremely close proximity to, the curved surface 21 of heel 19, and the transverse pin or shaft 26 is disposed at the forward ends of slots 33. Consequently, when hydraulic fluid is supplied to the rear of the cylinder through line 35 (FIG. 1) to cause retraction of piston 24, such retraction causes hook member 15 to pivot into its raised position (FIGS. 2–4) while at the same time the bearing contact between element 34 and heel surface 21 prevents any appreciable rearward movement of slide member 30 along drawbar 10. However, when the hook member 15 reaches its fully raised position (FIG. 4), the bearing element 34 of the slide member 30 clears surface 21, allowing the bearing element (and, in general, the rear end of the slide member 30) to enter recess 20 above heel portion 19. The result is that contraction of the cylinder-piston assembly causes two sequential actions to occur: first, a pivoting of hook member 15 into its raised position while slide member 30 remains stationary and, second, a rearward sliding movement of the slide member 30 when the hook member is fully raised. Of further importance is the fact that when the slide member advances rearwardly distance x from the position shown in FIG. 4 to the one depicted in FIG. 5, it also effectively locks hook member 15 against reverse movement, since such movement is blocked by engagement between the slide member 30 and the upper surface of heel 19 constituting a wall of recess 20. Conversely, when the flow of fluid to the cylinder is reversed, with fluid entering the front of the cylinder through line 36 and exiting the cylinder through line 35 (FIG. 1), such expansion of the cylinder-piston assembly results first in forward movement of slide member 30 and unlocking of hook member 15 (as the slide member moves forwardly from the position of FIG. 5 to the position of FIG. 4), followed by pivotal movement of the hook member into its lowered or releasing position (FIGS. 3 and 2).

The limited movement x of the slide member is also utilized to perform an additional function, specifically, the advancement and retraction of a plug-in connector assembly 40 shown in phantom in FIG. 2 and illustrated with greater clarity in FIGS. 6, 7, 9, and 1. The connector assembly includes a frame 41 mounted upon horizontal support 42 by links 43 and pin 44 so that the frame is capable of limited rocking movement in a vertical plane about the axis of the pin. A spring 45 acts to retain the frame in the position shown in the drawings while at the same time allowing limited rocking movement in either direction from that neutral position.

Support 42 is attached to a pair of horizontal rods 46 carried by parallel slotted tubes 47 secured to the top of rear end portion 10b of the drawbar. The connector or coupler 40 is therefore supported for linear movement between a forwardly retracted position depicted in FIG. 6 and a rearwardly extended position represented in FIG. 7.

A horizontal rack gear 48 with downwardly facing teeth is secured to the support 42 and the teeth of that gear engage those of pinion 49 carried by shaft 50. The transversely-extending shaft 50 is journaled in drawbar 10 and also carries a second pinion 51 having a diameter substantially smaller than that of pinion 49. The teeth of pinion 51 engage a second horizontal rack gear 52 projecting rearwardly from and secured to slide member 30.

The connector or coupler 40 therefore advances and retracts only when slide member 30 moves rearwardly and forwardly and, because of the size difference between pinions 49 and 51, such advancement and retraction occurs at a substantially faster rate than that of slide member 30, and over a substantially greater distance than the extent of movement of the slide member. As already pointed out, the slide member is last to move during a hitching operation and first to move during an unhitching operation; therefore, plug-in connector 40 advances rearwardly during a coupling operation only after hook member 15 is fully raised (FIG. 6), and retracts forwardly to its full extent before the hook member is free to commence downward swinging movement into a releasing position.

Connector or coupler 40 is provided with a plurality of rearwardly-facing quick-disconnect couplings 53 communicating with tractor hydraulic lines 54. As well known, such couplings are valved so that they automatically open and close when connections are respectively made and broken. To protect frame 41 and couplings 53, the entire connector assembly may be enclosed within a suitable casing 55 mounted upon support 42 and shown only in phantom in FIGS. 6 and 7.

Implement tongue 12 supports a connector assembly 56 adapted to mate with connector assembly 40 when the implement and tractor are fully hitched together. Connector assembly 56 includes a frame 57 having an upstanding portion 57a and a horizontal lower portion 57b. A plurality of vertical helical springs 58 extend upwardly from tongue 12 to support frame 57, such springs providing a resilient mounting for connector 56 for the purpose of allowing limited universal movement of the connector. Such universal movement of connector or coupler 56 is important in accommodating relative movement of the tractor and implement after such units have been hitched together and traverse uneven terrain, execute turns, and the like. A vertically-reciprocable stabilizing rod 59 is carried by tongue 12 beneath frame portion 57b. An inverted funnel-shaped deflector 60 is mounted on frame portion 57b directly above the stabilizing rod for the purpose of guiding the rounded upper end of that rod into opening 61 when the rod is raised. With the rod in its raised position (FIG. 6), movement of coupling assembly 56 is restrained, being generally restricted to limited vertical movement along the axis of rod 59 and limited swinging movement about that axis.

Figure 6:
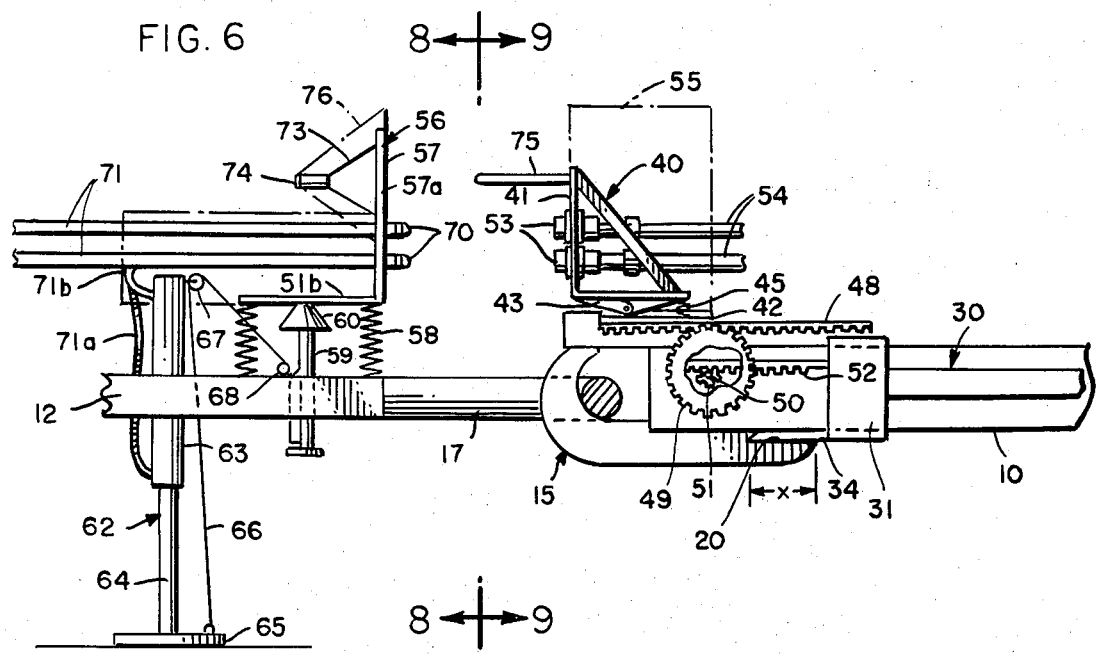
FIG. 6 is a side elevational view showing the relative positions of the hydraulic couplers as a hitching operation takes place.

A hydraulic jack 62 is mounted upon tongue 12 directly behind connector or coupler 56. The jack includes a hydraulic cylinder 63 and reciprocable piston shaft 64, the latter being provided with an enlarged plate or shoe 65 at its lower end for supporting the implement tongue upon a ground surface. In the illustration given, cable 66 is connected at one end to shoe 65, extends about pulleys 67 and 68, continues through vertical passage 69 in the tongue, and is connected at its opposite end to the lower end of stabilizing rod 59. When the jack is extended into ground contact as shown in FIG. 6, the stabilizing rod is held in its raised position to stabilize coupler 56 against excessive movement that would be undesirable during a hitching operation, whereas when the jack is retracted (FIG. 7), the stabilizing rod is lowered and coupler 56 is released for the greater range of movements needed when the hitched tractor and implement travel over a ground or road surface.

Figure 7:
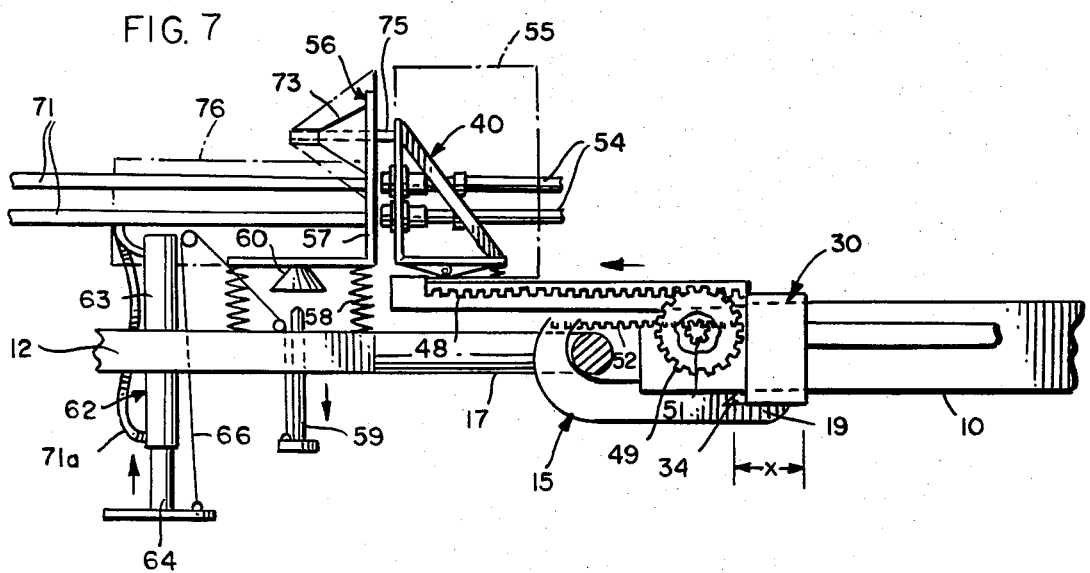
FIG. 7 is an elevational view similar to FIG. 6 but illustrating the final steps of a hitching operation.

The upstanding wall portion 57a of frame 57 supports a plurality of male connectors 70 which project forwardly from the frame and which are positioned and arranged to mate with female connectors 53 when the two couplers or connector assemblies 40 and 56 are brought together as depicted in FIGS. 1 and 7. Like female couplings 53, male couplings 70 are valved so that they seal upon disengagement. The couplers 70 communicate with hyrdaulic lines 71 needed for operation of the implement, two of the lines 71a and 71b leading to hydraulic cylinder 63 for operation of jack 62.

Although the hitch mechanism has been illustrated and described with male couplings 70 provided by connector assembly 56 and female couplings 53 carried by connector assembly 55, it is believed apparent that the male-female orientation might be reversed. Furthermore, while hydraulic couplings are illustrated, it is to be understood that the plug-in connectors might be for air hoses, fluid supply lines, or electrical lines, depending on the type of implement involved and the equipment required to be operated.

Figure 8:
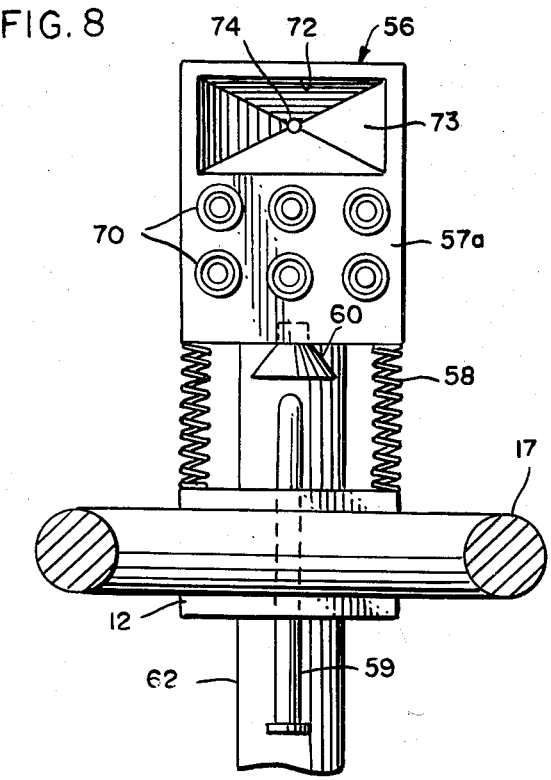
FIG. 8 is an enlarged sectional view taken along line 8—8 of FIG. 6.

The vertical wall portion 57a of frame 57 has an enlarged forwardly-facing opening 72 disposed above the array of couplings 70, as depicted most clearly in FIG. 8. Hollow-shaped walls 73 define a tapered cavity extending rearwardly from that opening, the cavity leading to a reduced guide passage 74. Although opening 72, and hence the vertical sectional configuration of the cavity, are shown to be rectangular in configuration, an oval or circular configuration might instead be used. The purpose of the cavity is to define a rearwardly-tapered guide socket for receiving an alignment rod 75 secured to and projecting horizontally rearwardly from the frame 41 of the connector assembly 40 supported upon the tractor drawbar (FIG. 6). During the final stages of a hitching operation, after the ring 17 of implement tongue 12 has been hooked by hook member 15 and has been lifted into general alignment with the drawbar (FIG. 6), slide member 30 drives connector assembly 40 rearwardly to direct alignment rod 75 into the tapered cavity of the alignment cone. The tip of the alignment rod reaches reduced opening 74 before the male and female couplings 70 and 53 move into engagement. Since connector assembly 56 is free to move limited distances along and about the axis of stabilizing rod 59, the entire connector assembly 56 is repositioned and aligned by rod 75 to insure proper mating of plug-in connectors 53 and 70.

Once the quick-connect couplings 53 and 70 are mated, hydraulic fluid may be directed from the tractor to jack 62 to retract the jack and simultaneously withdraw stabilizing rod 59 from opening 61 and cone 60. The hitching operation is thereby completed. Unhitching simply involves the reverse sequence of steps, with jack 62 first extending to support the implement tongue, connector assembly 55 then retracting forwardly to break fluid and electrical connections, and hook member 15 being unlocked and then swinging into its lowered implement-releasing position.

Like connector assembly 40, assembly 56 may be provided with a protective casing shown in phantom in FIGS. 6 and 7 and generally designated by numeral 76.

While in the foregoing we have disclosed an embodiment of the invention in considerable detail for purposes of illustration, it will be understood by those skilled in the art that many of these details may be varied without departing from the spirit and scope of the invention.

We claim:

1. A tractor hitch for connecting a tractor to an implement to be drawn thereby, comprising a tractor drawbar having a shank portion and a rear end portion; a slide member slidably mounted upon said shank portion for rearward and forward movement therealong; means for limiting the extent of sliding movement of said slide member along said shank portion; a hook member pivotally mounted upon said rear end portion of said drawbar for pivotal movement in a vertical plane between lowered and raised positions, said hook member having a rear hook section that projects upwardly when said hook member is raised and having a front section providing a lever arm; an expandable-contractable power drive assembly disposed along said shank portion and operatively connected to both said lever arm and said slide member for (a) raising said hook member and urging said slide member rearwardly when said assembly is contracted, and (b) directing said slide member forwardly and urging said hook member towards its lowered position when said assembly is expanded; said front section of said hook member also having a heel portion and having a recess between said heel portion and said lever arm for receiving a portion of said slide member when said slide member is extended rearwardly and said hook member is raised, said heel portion being engagable with said slide member to (a) block entry of said slide member into said recess, while said assembly is contracting, until said hook member is fully raised, and (b) prevent lowering of said hook member, while said assembly is being expanded, until said slide member is withdrawn from said recess.

2. The hitch of claim 1 in which said means for limiting the extent of sliding movement of said slide member restricts such movement to a distance slightly greater than the depth of said recess.

3. The hitch of claim 1 in which a plug-in connector assembly is disposed upon the rear end portion of said drawbar and is operatively connected to said slide member for rearward movement after said hook member is shifted into its raised position and for forward movement before said hook member commences movement into its lowered position.

4. The hitch of claim 3 in which said connector assembly is mounted upon a rack slidably supported upon said rear end portion of said drawbar; a first pinion mounted upon a shaft journaled on said drawbar for driving said rack forwardly and rearwardly; and a second rack secured to said slide member for engaging a second pinion mounted upon said shaft for rotating said shaft as said slide member travels forwardly and rearwardly.

5. The hitch of claim 4 in which said second pinion has a diameter larger than said first pinion, whereby, said connector travels forwardly and rearwardly a greater distance and at a faster rate than said slide member.

6. The hitch of claims 3, 4, or 5 in which said connector assembly includes a straight, rigid, elongated alignment rod projecting rearwardly therefrom beyond said rear end portion of said drawbar.

7. The hitch of claim 6 in which said connector assembly includes at least one rearwardly-facing coupling element for coupling said connector assembly to a fluid or electrical line.

8. The hitch of claim 7 in which a second plug-in connector assembly is provided for operatively engaging said first-mentioned connector assembly, said second connector assembly being mounted upon an implement tongue adjacent the front end thereof and having a cavity with an enlarged front opening and rearwardly tapering side walls for receiving said alignment rod and for aligning said first and second connector assemblies as said assemblies are urged into operative engagement.

9. The hitch of claim 8 in which said second connector assembly is resiliently mounted upon said implement tongue for limited vertical and horizontal movement thereon.

10. The hitch of claim 9 in which means are provided for restricting the extent of movement of said second connector assembly until said first and second assemblies are in operative engagement.

11. The hitch of claim 10 in which said coupling elements are adapted to conduct hydraulic fluid transmitted by hydraulic fluid lines; said implement tongue being provided with a hyrdaulic jack communicating with the coupling element of said second connector assembly for raising and lowering said tongue; and means operatively connecting said jack and said means for restricting movement of said second connector assembly to cause restriction of such movement only when said jack is extended.

12. A tractor hitch for connecting a tractor to an implement, comprising a tractor drawbar having a shank portion and a rear end portion; a slide member slidably mounted upon said shank portion for rearward and forward movement therealong; means for limiting the extent of sliding movement of said slide member along said shank portion; a hook member pivotally mounted upon said rear end portion of said drawbar for pivotal movement in a vertical plane between lowered and raised positions, said hook member having a rear hook section that projects upwardly when said hook member is raised and having a front section providing a lever arm; an expandable-contractable power drive assembly disposed along said shank portion and operatively connected above said lever arm and said slide member for (a) raising said hook member and urging said slide member rearwardly when said assembly is contracted, and (b) directing said slide member forwardly and urging said hook member towards its lowered position when said assembly is expanded; said assembly comprising a hydraulic cylinder and reciprocable piston disposed along said shank portion of said drawbar, one of said hook and slide members being connected to said piston and the other of said members being connected to said cylinder; said front section of said hook member also having a heel portion and having a recess between said heel portion and said lever arm for receiving a portion of said slide member when said slide member is extended rearwardly and said hook member is raised, said heel portion being engagable with said slide member to (a) block entry of said slide member into said recess, while said assembly is contracting, until said hook member is fully raised, and (b) prevent lowering of said hook member, while said assembly is being expanded, until said slide member is withdrawn from said recess; whereby, forward and rearward movement of said slide member occurs only when said hook member is in raised and locked position.

13. The hitch of claim 12 in which said means for limiting the extent of sliding movement of said slide member restricts such movement to a distance slightly greater than the depth of said recess.

14. The hitch of claim 12 in which said hydraulic cylinder and piston are disposed above said drawbar.

15. The hitch of claim 12 in which said heel portion is provided with a curved bearing surface engagable with said slide member.

16. The hitch of claim 15 in which said curved bearing surface has a substantially uniform radiius measured from the pivot axis of said hook member.

17. The hitch of claim 12 in which a plug-in connector assembly is disposed upon the rear end portion of said drawbar and is operatively connected to said slide member for rearward movement after said hook member is shifted into its raised position and for forward movement before said hook member commences movement into its lowered position.

18. The hitch of claim 17 in which said connector assembly is mounted upon a rack slidably supported upon said rear end portion of said drawbar; a first pinion mounted upon a shaft journaled on said drawbar for driving said rack forwardly and rearwardly; and a second rack secured to said slide member and engaging a second pinion mounted upon said shaft for rotating said shaft as said slide member travels forwardly and rearwardly.

19. The hitch of claim 18 in which said second pinion has a diameter larger than said first pinion, whereby, said connector assembly travels forwardly and rearwardly a greater distance and at a faster rate than said slide member.

20. The hitch of claims 17, 18, or 19 in which a second plug-in connector assembly is provided for operatively engaging said first-mentioned connector assembly; said second connector assembly being mounted upon an implement tongue adjacent the front end thereof; one of said connector assemblies having a rigid horizontal alignment rod projecting therefrom and the other of said connector assemblies having a cavity with an enlarged opening and tapering side walls for receiving said alignment rod and for guiding said assemblies into alignment as they are urged into operative engagement.

21. The hitch of claim 20 in which said second connector assembly is resiliently mounted upon said implement tongue for limited vertical and horizontal movement thereon.

22. The hitch of claim 21 in which means are provided for restricting the extent of movement of said second connector assembly until said first and second assemblies are in operative engagement.

23. The hitch of claim 22 in which said connector assemblies are provided with matable coupling elements adapted to conduct hydraulic fluid transmitted by hydraulic fluid lines when said coupling elements are mated; said implement tongue being provided with a hydraulic jack communicating with the coupling elements of said second connector assembly for lifting and lowering said tongue; and means operatively connecting said jack and said means for restricting movement of said second connector assembly to cause restriction of such movement only when said jack is extended.

24. The hitch of claim 20 in which said implement tongue is provided with a forwardly-facing ring extending along a horizontal plane and having an opening for receiving said hook member when said hook member is raised.

* * * * *